(12) United States Patent
Ashihara et al.

(10) Patent No.: US 8,901,252 B2
(45) Date of Patent: Dec. 2, 2014

(54) METHOD OF DECOMPOSING ORGANIC COMPOUND

(75) Inventors: Shingo Ashihara, Mito (JP); Toshiharu Goto, Takahagi (JP); Takanori Yamazaki, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 956 days.

(21) Appl. No.: 12/488,984

(22) Filed: Jun. 22, 2009

(65) Prior Publication Data

US 2009/0318623 A1 Dec. 24, 2009

(30) Foreign Application Priority Data

Jun. 20, 2008 (JP) ................. 2008-161592

(51) Int. Cl.
| | |
|---|---|
| C08F 10/02 | (2006.01) |
| B29B 17/04 | (2006.01) |
| B29K 105/24 | (2006.01) |
| B29K 23/00 | (2006.01) |
| B29L 31/34 | (2006.01) |

(52) U.S. Cl.
CPC ............. *B29B 17/04* (2013.01); *B29K 2105/24* (2013.01); *B29K 2023/0691* (2013.01); *B29L 2031/3462* (2013.01)
USPC ................... 525/333.7; 525/383; 521/42.5

(58) Field of Classification Search
CPC .... C08F 230/08; B29B 17/04; B29B 2017/00
USPC ................. 525/383, 333.7; 521/42.5
See application file for complete search history.

(56) References Cited

U.S. PATENT DOCUMENTS

| | | | | |
|---|---|---|---|---|
| 3,923,883 A | * | 12/1975 | Gaenzler et al. | 562/521 |
| 5,602,186 A | * | 2/1997 | Myers et al. | 521/41 |
| 6,172,253 B1 | * | 1/2001 | Kawamoto | 556/466 |
| 2008/0045617 A1 | | 2/2008 | Goto et al. | |

FOREIGN PATENT DOCUMENTS

| | | | | |
|---|---|---|---|---|
| JP | 2002-187976 | | 7/2002 | |
| JP | 2002-212334 | | 7/2002 | |
| JP | 2002-249618 | | 9/2002 | |
| JP | 2005-2203 | | 1/2005 | |
| JP | 2005-022245 | | 1/2005 | |
| JP | 2005002203 | * | 6/2005 | ............ C08J 11/24 |
| JP | 2008-38006 | | 2/2006 | |
| JP | 3855006 | | 9/2006 | |

OTHER PUBLICATIONS

Tundo, et al., "The Chemistry of Dimethyl Carbonate", Acc. Chem. Res., 2002, pp. 706-716, vol. 35, No. 9.
Notification of Reason(s) for Refusal dated Apr. 3, 2012 received from the Japanese Patent Office in related Japanese Patent Application No. 2008-161592, together with an English-language translation.
Notification of Reason(s) for Refusal dated Jan. 10, 2012 received from the Japanese Patent Office from related Japanese Application No. 2008-161592, together with a partial English-language translation.

* cited by examiner

*Primary Examiner* — Ling Choi
*Assistant Examiner* — Chun-Cheng Wang
(74) *Attorney, Agent, or Firm* — Scully, Scott, Murphy & Presser, P.C.

(57) ABSTRACT

A method of decomposing an organic compound includes decomposing an organic compound by alkyl carbonate at 250° C. or more. The organic compound includes a cross-linked polymer. The cross-linked polymer includes a polymer cross-linked by organic peroxide cross-linking, radiation cross-linking, or silane cross-linking The alkyl carbonate includes dimethyl carbonate or diethyl carbonate.

9 Claims, 1 Drawing Sheet

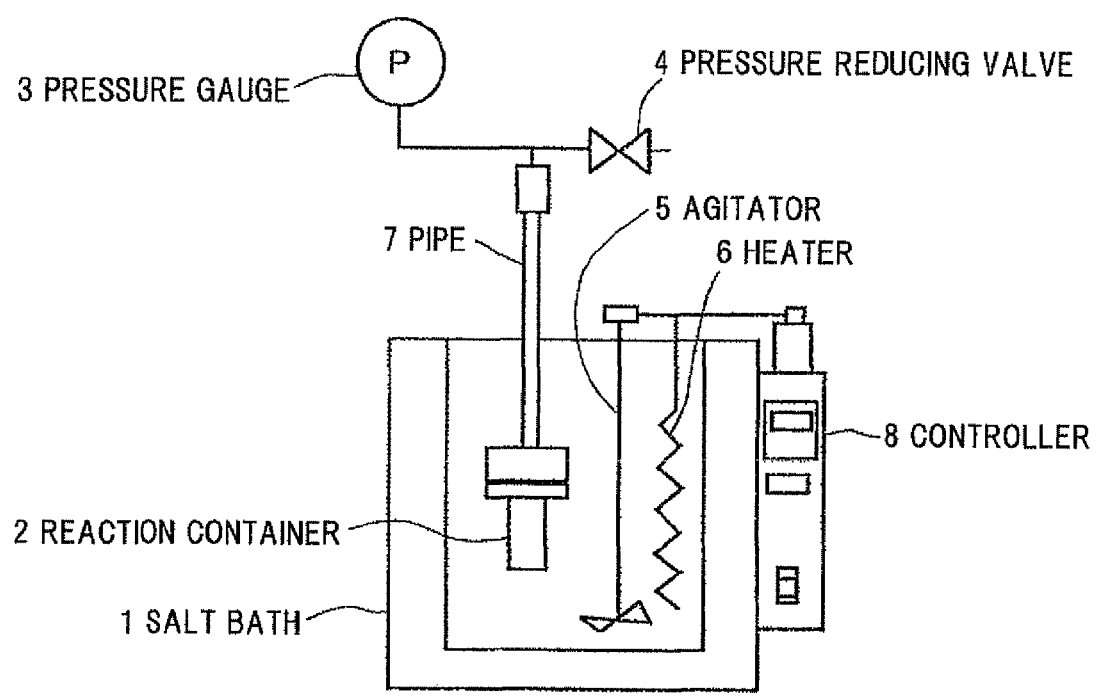

METHOD OF DECOMPOSING ORGANIC COMPOUND

The present application is based on Japanese Patent Application No. 2008-161592 filed on Jun. 20, 2008, the entire contents of which are incorporated herein by reference.

BACKGROUND OF THE INVENTION

1. Field of the Invention

The invention relates to a method of decomposing an organic compound, especially decomposing a cross-linked polymer, in more particular, relates to a method of decomposing an organic compound for disposal by decomposition of an organic compound such as a cross-linked polymer using alkyl carbonate.

2. Related Art

Waste disposal is a serious problem in a modern society in which there is an urgent need to deal with environmental problems. Among various wastes, polymers widely used for composite materials, etc. including various raw materials are also not an exception. In the previous examination, since fluidity of a thermoplastic polymer is increased by heating and it is thereby possible to reshape, a material recycle is proceeding. In addition, an examination of a biomass-derived polymer, which attracts attention as an alternative natural resource and due to carbon neutral properties, is actively carried on.

On the other hand, a thermosetting polymer, a cross-linked polymer and rubber are not fluidized by heating due to a three-dimensional molecule network thereof and formation is not possible, hence, the material recycle is difficult. Therefore, in many cases, those materials are sent to disposal such as a landfill, etc., even though a thermal recycle is partially carried out.

An action to try to implement material recycle for a thermosetting polymer and a cross-linked polymer is enhanced, and techniques enabling the thermal recycle are emerging. For example, JP-A 3855006 describes a method in which a cross-linked polyethylene is decomposed in supercritical carbon dioxide using nitrogen dioxide as a radical reaction initiator for obtaining a high value-added product such as adipic acid.

In addition, JP-A 2008-038006 describes a method in which C—C bond bifurcation in the cross-linked polymer is preferentially oxidatively decomposed by nitrogen oxide in the supercritical carbon dioxide for obtaining a high-molecular weight thermoplastic product. In addition, JP-A 2002-187976 describes a method in which a siloxane bond as a cross-linking bond of a silane cross-linked polymer is selectively disconnected by contact with high-temperature alcohol for thermally plasticizing.

However, in the method of decomposing a cross-linked polyethylene by the nitrogen dioxide in the supercritical carbon dioxide such as described in JP-A 3855006 and JP-A 2008-038006, toxicity of nitrogen dioxide to be used is a problematic, thus, an environmental standard therefor is set by the Air Pollution Control Act due to high adverse effect to human body (especially to a respiratory system) and strong toxicity thereof. Therefore, the nitrogen dioxide is a substance of which use should be avoided as much as possible, and development of a recycle method using a substance which is safer in use is required.

In addition, in the method using the high-temperature alcohol such as described in JP-A 2002-87976, the siloxane bond in the cross-linked polymer is selectively disconnected and it is efficient for heat plasticization of the silane cross-linked polymer in which the siloxane bond is used for the cross-linking bond, however, it is not efficient for the cross-linked polymer not having the siloxane bond. Therefore, in the case that, for example, the cross-linked polymer not having the siloxane bond is mixed in the silane cross-linked polymer, the material recycle is assumed to be difficult.

THE SUMMARY OF THE INVENTION

Therefore, in order to solve the above-mentioned problem, it is an object of the invention to provide a method of decomposing an organic compound in which, by using alkyl carbonate which can be relatively safely treated, it is possible to decompose an organic compound, especially a cross-linked polymer, in short time compared with a conventional method.

(1) According to one embodiment of the invention, a method of decomposing an organic compound comprises:

decomposing an organic compound by alkyl carbonate at 250° C. or more.

In the above embodiment (1), the following modifications and changes can be made.

(i) The organic compound comprises a cross-linked polymer.

(ii) The cross-linked polymer comprises a polymer cross-linked by organic peroxide cross-linking or radiation cross-linking.

(iii) The cross-linked polymer comprises a polymer cross-linked by silane cross-linking.

(iv) The alkyl carbonate comprises dimethyl carbonate or diethyl carbonate.

According to one embodiment of the invention, a method of decomposing an organic compound is conducted such that the organic compound can be fast decomposed by alkyl carbonate at high temperature. For example, the method can be effective in a reaction that an organic compound such as a cross-linked polyethylene included in a wire covering waste material, is decomposed by dimethyl carbonate or diethyl carbonate.

BRIEF DESCRIPTION OF THE DRAWINGS

Next, the present invention will be explained in more detail in conjunction with appended drawings, wherein:

FIG. 1 is a schematic view showing an experimental apparatus used for an examination of the invention.

DESCRIPTION OF THE PREFERRED EMBODIMENTS

Preferred embodiments according to the invention will be explained in detail as below in conjunction with appended drawings.

A polymer (an organic compound), which is decomposed in the embodiment, covers all polymers having a cross-linked structure in which, preferably, molecules are three-dimensionally cross-linked. A cross-linking method and a cross-linked structure of the molecule are not specifically limited.

A cross-linked polymer is a polyolefin resin, especially, electric wire and cable waste. The electric wire and cable waste includes all wastes related to electric wires and cables, such as electric wires and cables disposed before use due to overflow or defect produced during the fabrication of electric wires and cables or due to other reasons, in addition to electric wires and cables collected after use in the market.

Dimethyl carbonate or diethyl carbonate is especially preferable as alkyl carbonate.

Next, an apparatus for disposing an organic compound by alkyl carbonate will be explained in conjunction with FIG. 1.

FIG. 1 shows a salt bath 1 provided with an agitator 5 and a heater 6, and inside of the salt bath 1 is heated to a predetermined temperature by a controller 8.

A reaction container 2 fabricated by SUB with a capacity of 20 cc enclosing an organic compound and alkyl carbonate is placed in the salt bath 1.

Here, after enclosing a polymer and the alkyl carbonate in the reaction container 2, in order to prevent oxidation of the polymer, an inert gas such as an Ar gas is supplied into the reaction container 2 through a pipe 7, and the inside of the reaction container 2 is sufficiently purged with the Ar gas via the same pipe 7 and a pressure reducing valve 4, and then, the reaction container 2 is placed in the salt bath 1.

As for the organic compound and the alkyl carbonate, temperature and pressure of the alkyl carbonate are increased to a predetermined temperature and a predetermined pressure (a critical or subcritical state) in the reaction container 2, and the organic compound is decomposed by reaction with the alkyl carbonate At this time, the pressure during the reaction is constantly monitored by a pressure gauge 3 connected to the reaction container 2. When a predetermined reaction time is elapsed, the reaction container 2 is taken out from the salt bath 1 and is water-cooled. After the water-cooling, when the pressure inside the reaction container 2 is sufficiently decreased, a reaction product and a liquid residue are removed from the reaction container 2.

Decomposition of the cross-inked polyethylene as a cable waste by dimethyl carbonate or diethyl carbonate is examined by the apparatus shown in FIG. 1.

As shown in Table 1, the used cross-linked polyethylenes are a chemical cross-linked polyethylene in which a polyethylene molecular chain is cross-linked using an organic peroxide (material 1) and a silane cross-linked polyethylene which is cross-linked by silane water cross-link (material 2).

TABLE 1

| | | Blending amount (parts by weight) | |
|---|---|---|---|
| Item | | Chemical cross-linked polyethylene (material 1) | Silane cross-linked polyethylene (material 2) |
| Base polyethylene | LDPE (number average molecular weight 43000) | 100 | — |
| | LLDPE (number average molecular weight 51000) | — | 100 |

TABLE 1-continued

| | | Blending amount (parts by weight) | |
|---|---|---|---|
| Item | | Chemical cross-linked polyethylene (material 1) | Silane cross-linked polyethylene (material 2) |
| Cross-linker | Vinyltrimethoxysilane | — | 1 |
| | DCP | 1 | 0.05 |
| Cross-linking catalyst | Dibutyltin dilaurate | — | 0.05 |
| Antioxidant | Antioxidant A | 0.16 | — |
| Lubricant | Lubricant A | 0.15 | — |

The measured gel fractions of the cross-linked polyethylenes were 84% for the chemical cross-linked polyethylene and 65% for the silane cross-linked polyethylene. Here, the gel fraction is an index representing the degree of cross-linking of the polymer, and is a percentage which is derived by dividing a weight of polymer remained on a wire mesh after the polymer put in the wire mesh was extracted in 110° xylene for 24 hours by the original weight of the polymer.

Next, a reaction container, into which 1.5 g of the cross-linked polyethylene as well as dimethyl carbonate or diethyl carbonate with an amount adjusted so as to be a predetermined pressure were introduced, was placed in the salt bath which was preliminarily heated to a predetermined temperature under the conditions shown in Table 2. The reaction time was 3-30 minutes, and the reaction time is defined as from the time when the reaction container is placed in the salt bath until the time when the reaction container is taken out from the salt bath. After the reaction time elapsed, the reaction container was taken out from the salt bath and was sufficiently water-cooled, and then, the reaction product was collected and evaluated after releasing the residual pressure.

In order to evaluate whether the cross-linked polyethylene was decomposed by the dimethyl carbonate or the diethyl carbonate, the gel fraction and molecular weight of the reaction product were measured The decomposition of the cross-linked polyethylene was judged as "pass" when the gel fraction of the reaction product is less than 50% of the gel fraction of the cross-linked polyethylene before the decomposition, and judged as "fail" when 50% or more. In addition, for the reaction product of which the gel fraction is 0%, the molecular weight was measured by High Temperature GPC (Gel Permeation Chromatography) using o-dichlorobenzene as a solvent for the comparison with the base polyethylene of the cross-linked polyethylene before the reaction (see Table 1).

Examples 1-20 and Comparative Examples 1-6 are shown in Table 2.

TABLE 2

| | Reaction conditions | | | Introduced amount | | | | Evaluation results and raw material properties of reaction product | |
|---|---|---|---|---|---|---|---|---|---|
| Raw material | Temperature (° C.) | Pressure (MPa) | Time (minute) | Raw material (cross-linked polyethylene) (g) | dimethyl carbonate (g) | diethyl carbonate (g) | gel fraction (%) | Judgment (Passed when less than 50% of gel fraction of cross-linked polyethylene material) | Number average molecular weight |
| Chemical cross-linked polyethylene | — | — | — | — | — | — | 84 | — | — |

TABLE 2-continued

| Raw material | | Reaction conditions | | | Introduced amount | | | Evaluation results and raw material properties of reaction product | | |
|---|---|---|---|---|---|---|---|---|---|---|
| | | Temperature (° C.) | Pressure (MPa) | Time (minute) | Raw material (cross-linked polyethylene) (g) | dimethyl carbonate (g) | diethyl carbonate (g) | gel fraction (%) | Judgment (Passed when less than 50% of gel fraction of cross-linked polyethylene material) | Number average molecular weight |
| Silane cross-linked polyethylene | — | — | — | — | — | — | — | 65 | — | — |
| Chemical cross-linked polyethylene | Example 1 | 310 | 4.7 | 30 | 1.5 | 4.1 | — | 39 | x | — |
| | Example 2 | 330 | 6.0 | 30 | 1.5 | 5.0 | — | 31 | ○ | — |
| | Example 3 | 340 | 5.3 | 30 | 1.5 | 4.0 | — | 7 | ○ | — |
| | Example 4 | 350 | 6.3 | 30 | 1.5 | 3.8 | — | 0 | ○ | 12000 |
| | Example 5 | 350 | 6.2 | 10 | 1.5 | 3.8 | — | 10 | ○ | — |
| | Example 6 | 290 | 7.2 | 30 | 1.5 | — | 9.5 | 40 | x | — |
| | Example 7 | 310 | 4.0 | 30 | 1.5 | — | 9.0 | 32 | ○ | — |
| | Example 8 | 330 | 14.2 | 30 | 1.5 | — | 7.5 | 19 | ○ | — |
| | Example 9 | 335 | 16.7 | 30 | 1.5 | — | 7.2 | 2 | ○ | — |
| | Example 10 | 340 | 17.0 | 30 | 1.5 | — | 6.5 | 0 | ○ | 12000 |
| | Example 11 | 340 | 16.9 | 10 | 1.5 | — | 6.5 | 6 | ○ | — |
| Silane cross-linked polyethylene | Example 12 | 250 | 2.8 | 30 | 1.5 | 6.4 | — | 31 | ○ | — |
| | Example 13 | 290 | 5.5 | 30 | 1.5 | 5.0 | — | 0 | ○ | 45000 |
| | Example 14 | 290 | 4.5 | 10 | 1.5 | 5.0 | — | 0 | ○ | 47000 |
| | Example 15 | 330 | 5.0 | 5 | 1.5 | 3.2 | — | 0 | ○ | 47000 |
| | Example 16 | 330 | 3.4 | 3 | 1.5 | 3.2 | — | 17 | ○ | — |
| | Example 17 | 250 | 2.9 | 30 | 1.5 | — | 7.0 | 0 | ○ | 48000 |
| | Example 18 | 290 | 3.0 | 30 | 1.5 | — | 7.0 | 17 | ○ | — |
| | Example 19 | 290 | 2.5 | 10 | 1.5 | — | 7.0 | 0 | ○ | 46000 |
| | Example 20 | 330 | 2.7 | 3 | 1.5 | — | 7.5 | 14 | ○ | — |
| Chemical cross-linked polyethylene | Comparative Example 1 | 240 | 2.4 | 30 | 1.5 | 6.4 | — | 61 | x | — |
| | Comparative Example 2 | 240 | 2.3 | 30 | 1.5 | — | 7.0 | 56 | x | — |
| | Comparative Example 3 | 350 | 0.2 | 30 | 1.5 | — | — | 66 | x | — |
| Silane cross-linked polyethylene | Comparative Example 4 | 230 | 1.8 | 30 | 1.5 | 6.4 | — | 47 | x | — |
| | Comparative Example 5 | 230 | 2.0 | 30 | 1.5 | — | 7.0 | 43 | x | — |
| | Comparative Example 6 | 330 | 0.2 | 30 | 1.5 | — | — | 50 | x | — |

EXAMPLE 1

An experiment of decomposing the chemical cross-linked polyethylene was carried out using the dimethyl carbonate. When the experiment was carried out at a salt bath temperature of 310° C. for 30 minutes of the reaction time, the gel fraction of the reaction product was 39%, which suggests that the chemical cross-linked polyethylene was decomposed by the dimethyl carbonate.

EXAMPLE 2

An experiment of decomposing the chemical cross-linked polyethylene was carried out using the dimethyl carbonate. When the experiment was carried out at a salt bath temperature of 330° C. for 30 minutes of the reaction time, the gel fraction of the reaction product was 31%, which suggests that the cross-linked structure of the chemical cross-linked polyethylene was decomposed by the dimethyl carbonate.

EXAMPLE 3

An experiment of decomposing the chemical cross-linked polyethylene was carried out using the dimethyl carbonate. When the experiment was carried out at a salt bath temperature of 340° C. for 30 minutes of the reaction time, the gel fraction of the reaction product was 7%, which suggests that the cross-linked structure of the chemical cross-linked polyethylene was decomposed by the dimethyl carbonate.

EXAMPLE 4

An experiment of decomposing the chemical cross-linked polyethylene was carried out using the dimethyl carbonate. When the experiment was carried out at a salt bath temperature of 350° C. for 30 minutes of the reaction time, the gel fraction of the reaction product was 0%, which suggests that the cross-linked structure of the chemical cross-linked polyethylene was decomposed by the dimethyl carbonate. In addition, since the number average molecular weight of the reaction product was 12000 and a rapid decrease in the molecular weight did not occur, it was suggested that a C—C bond of a cross-linked portion was preferentially decomposed by the dimethyl carbonate with respect to a polyethylene main chain.

EXAMPLE 5

An experiment of decomposing the chemical cross-linked polyethylene was carried out using the dimethyl carbonate. When the experiment was carried out at a salt bath temperature of 350° C. for 10 minutes of the reaction time, the gel fraction of the reaction product was 10%, which suggests that the cross-linked structure of the chemical cross-linked polyethylene was decomposed by the dimethyl carbonate.

EXAMPLE 6

An experiment of decomposing the chemical cross-linked polyethylene was carried out using the diethyl carbonate. When the experiment was carried out at a salt bath temperature of 290° C. for 30 minutes of the reaction time, the gel fraction of the reaction product was 40%, which suggests that the cross-linked structure of the chemical cross-linked polyethylene was decomposed by the diethyl carbonate.

EXAMPLE 7

An experiment of decomposing the chemical cross-linked polyethylene was carried out using the diethyl carbonate. When the experiment was carried out at a salt bath temperature of 310° C. for 30 minutes of the reaction time, the gel fraction of the reaction product was 32%, which suggests that the cross-linked structure of the chemical cross-linked polyethylene was decomposed by the diethyl carbonate.

EXAMPLE 8

An experiment of decomposing the chemical cross-linked polyethylene was carried out using the diethyl carbonate. When the experiment was carried out at a salt bath temperature of 330° C. for 30 minutes of the reaction time, the gel fraction of the reaction product was 19%, which suggests that the cross-linked structure of the chemical cross-linked polyethylene was decomposed by the diethyl carbonate.

EXAMPLE 9

An experiment of decomposing the chemical cross-linked polyethylene was carried out using the diethyl carbonate. When the experiment was carried out at a salt bath temperature of 335° C. for 30 minutes of the reaction time, the gel fraction of the reaction product was 2%, which suggests that the cross-linked structure of the chemical cross-linked polyethylene was decomposed by the diethyl carbonate.

EXAMPLE 10

An experiment of decomposing the chemical cross-linked polyethylene was carried out using the diethyl carbonate. When the experiment was carried out at a salt bath temperature of 340° C. for 30 minutes of the reaction time, the gel fraction of the reaction product was 0%, which suggests that the cross-linked structure of the chemical cross-linked polyethylene was decomposed by the diethyl carbonate. In addition, since the number average molecular weight of the reaction product was 12000 and a rapid decrease in the molecular weight did not occur, it was suggested that a C—C bond of a cross-linked portion was preferentially decomposed by the diethyl carbonate with respect to a polyethylene main chain.

EXAMPLE 11

An experiment of decomposing the chemical cross-linked polyethylene was carried out using the diethyl carbonate. When the experiment was carried out at a salt bath temperature of 340° C. for 10 minutes of the reaction time, the gel fraction of the reaction product was 6%, which suggests that the cross-linked structure of the chemical cross-linked polyethylene was decomposed by the diethyl carbonate.

EXAMPLE 12

An experiment of decomposing the silane cross-linked polyethylene was carried out using the dimethyl carbonate. When the experiment was carried out at a salt bath temperature of 250° C. for 30 minutes of the reaction time, the gel fraction of fine reaction product was 31%, which suggests that the cross-linked structure of the silane cross-linked polyethylene was decomposed by the dimethyl carbonate.

EXAMPLE 13

An experiment of decomposing the silane cross-linked polyethylene was carried out using the dimethyl carbonate. When the experiment was carried out at a salt bath temperature of 290° C. for 30 minutes of the reaction time, the gel fraction of the reaction product was 0%, which suggests that the cross-linked structure of the silane cross-linked polyethylene was decomposed by the dimethyl carbonate. In addition, since the number average molecular weight of the reaction product was 45000 and a rapid decrease in the molecular weight did not occur, it was suggested that a C—C bond or a siloxane bond of a cross-linked portion was selectively decomposed by the dimethyl carbonate with respect to a polyethylene main chain.

EXAMPLE 14

An experiment of decomposing the silane cross-linked polyethylene was carried out using the dimethyl carbonate. When the experiment was carried out at a salt bath temperature of 290° C. for 10 minutes of the reaction time, the gel fraction of the reaction product was 0%, which suggests that the cross-linked structure of the silane cross-linked polyethylene was decomposed by the dimethyl carbonate. In addition, since the number average molecular weight of the reaction product was 47000, it was suggested that a C—C bond or a siloxane bond of a cross-linked portion was selectively decomposed by the dimethyl carbonate with respect to a polyethylene main chain.

EXAMPLE 15

An experiment of decomposing the silane cross-linked polyethylene was carried out using the dimethyl carbonate. When the experiment was carried out at a salt bath temperature of 330° C. for 5 minutes of the reaction time, the gel fraction of the reaction product was 0%, which suggests that the cross-linked structure of the silane cross-linked polyethylene was decomposed by the dimethyl carbonate. In addition, since the number average molecular weight of the reaction product was 47000, it was suggested that a C—C bond or a siloxane bond of a cross-linked portion was selectively decomposed by the dimethyl carbonate with respect to a polyethylene main chain.

EXAMPLE 16

An experiment of decomposing the silane cross-linked polyethylene was carried out using the dimethyl carbonate. When the experiment was carried out at a salt bath temperature of 330° C. for 3 minutes of the reaction time, the gel fraction of the reaction product was 17%, which suggests that the cross-linked structure of the silane cross-linked polyethylene was decomposed by the dimethyl carbonate.

EXAMPLE 17

An experiment of decomposing the silane cross-linked polyethylene was carried out using the diethyl carbonate. When the experiment was carried out at a salt bath temperature of 250° C. for 30 minutes of the reaction time, the gel fraction of the reaction product was 0%, which suggests that the cross-linked structure of the silane cross-linked polyethylene was decomposed by the diethyl carbonate. In addition, since the number average molecular weight of the reaction product was 48000, it was suggested that a C—C bond or a siloxane bond of a cross-linked portion was selectively decomposed by the diethyl carbonate with respect to a polyethylene main chain.

EXAMPLE 18

An experiment of decomposing the silane cross-linked polyethylene was carried out using the diethyl carbonate. When the experiment was carried out at a salt bath temperature of 290° C. for 30 minutes of the reaction time, the gel fraction of the reaction product was 17%, which suggests that the cross-linked structure of the silane cross-linked polyethylene was decomposed by the diethyl carbonate.

EXAMPLE 19

An experiment of decomposing the silane cross-linked polyethylene was carried out using the diethyl carbonate. When the experiment was carried out at a salt bath temperature of 290° C. for 10 minutes of the reaction time, the gel fraction of the reaction product was 0%, which suggests that the cross-linked structure of the silane cross-linked polyethylene was decomposed by the diethyl carbonate. In addition since the number average molecular weight of the reaction product was 46000, it was suggested that a C—C bond or a siloxane bond of a cross-linked portion was selectively decomposed by the diethyl carbonate with respect to a polyethylene main chain.

EXAMPLE 20

An experiment of decomposing the silane cross-linked polyethylene was carried out using the diethyl carbonate. When the experiment was carried out at a salt bath temperature of 330° C. for 3 minutes of the reaction time, the gel fraction of the reaction product was 14%, which suggests that the cross-linked structure of the silane cross-linked polyethylene was decomposed by the diethyl carbonate.

In Examples 1-20, although the examination is not carried out under the reaction time of more than 30 minutes since it is not meaningful from the viewpoint of industrialization, it is easily expected that the gel fraction of the reaction product can be reduced even under the same temperature condition or the temperature can be lowered by longer reaction time.

COMPARATIVE EXAMPLE 1

An experiment of decomposing the chemical cross-linked polyethylene was carried out using the dimethyl carbonate. When the experiment was carried out at a salt bath temperature of 240° C. for 30 minutes of the reaction time, the gel fraction of the reaction product was 61%, which suggests that it is not possible to sufficiently decompose the chemical cross-linked polyethylene by the dimethyl carbonate under this reaction condition.

COMPARATIVE EXAMPLE 2

An experiment of decomposing the chemical cross-linked polyethylene was carried out using the diethyl carbonate. When the experiment was carried out at a salt bath temperature of 240° C. for 30 minutes of the reaction time, the gel fraction of the reaction product was 56%, which suggests that it is not possible to sufficiently decompose the chemical cross-linked polyethylene by the diethyl carbonate under this reaction condition.

COMPARATIVE EXAMPLE 3

An experiment of heating only the chemical cross-linked polyethylene was carried out without using alkyl carbonate. When the experiment was carried out at a salt bath temperature of 350° C. for 30 minutes of the reaction time, the gel fraction of the chemical cross-linked polyethylene after heating was 66%, which suggests that it is not possible to sufficiently decompose the cross-linked polyethylene by simply heating the chemical cross-linked polyethylene.

COMPARATIVE EXAMPLE 4

An experiment of decomposing the silane cross-linked polyethylene was carried out using the dimethyl carbonate. When the experiment was carried out at a salt bath temperature of 230° C. for 30 minutes of the reaction time, the gel fraction of the reaction product was 47%, which suggests that it is not possible to sufficiently decompose the silane cross-linked polyethylene by the dimethyl carbonate under this reaction condition.

COMPARATIVE EXAMPLE 5

An experiment of decomposing the silane cross-linked polyethylene was carried out using the diethyl carbonate. When the experiment was carried out at a salt bath temperature of 230° C. for 30 minutes of the reaction time, the gel fraction of the reaction product was 43%, which suggests that it is not possible to sufficiently decompose the silane cross-linked polyethylene by the diethyl carbonate under this reaction condition.

COMPARATIVE EXAMPLE 6

An experiment of heating only the silane cross-linked polyethylene was carried out without using alkyl carbonate. When the experiment was carried out at a salt bath temperature of 330° C. for 30 minutes of the reaction time, the gel fraction of the silane cross-linked polyethylene after heating was 50%, which suggests that it is not possible to sufficiently decompose the silane cross-linked polyethylene by simply heating the silane cross-linked polyethylene.

From Comparative Examples 1-6, it is understood that the alkyl carbonate is preferably used under a high temperature of 250° C. or more in order to sufficiently decomposed the chemical cross-linked polyethylene and the silane cross-linked polyethylene. In addition, it is suggested that the results of Examples 1-20 are not achieved by thermal decomposition, but by chemical reaction with the alkyl carbonate.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A method of decomposing an organic compound, comprising:
    enclosing the organic compound comprising cross-linked polymer comprising polyolefin resin and alkyl carbonate in a reaction container; and
    increasing a temperature in the reaction container to be not less than 250 degrees C., thereby reacting the organic compound and the alkyl carbonate in the reaction container and preferentially decomposing a C—C bond of the organic compound to form a reaction product.

2. The method of decomposing an organic compound according to claim 1, wherein the cross-linked polymer comprises organic peroxide cross-linked polymer or radiation cross-linked polymer.

3. The method of decomposing an organic compound according to claim 1, wherein the cross-linked polymer comprises silane cross-linked polymer.

4. The method of decomposing an organic compound according to claim 1, wherein the alkyl carbonate comprises dimethyl carbonate or diethyl carbonate.

5. The method of decomposing an organic compound according to claim 2, wherein the alkyl carbonate comprises dimethyl carbonate or diethyl carbonate.

6. The method of decomposing an organic compound according to claim 3, wherein the alkyl carbonate comprises dimethyl carbonate or diethyl carbonate.

7. The method of decomposing an organic compound according to claim 1, wherein the polyolefin resin comprises polyethylene.

8. The method of decomposing an organic compound according to claim 1, wherein the pressure in the reaction container is not less than 1 MPa.

9. The method of decomposing an organic compound according to claim 8, wherein a gel fraction of the reaction product is less than 50% of a gel fraction of the cross-linked polyethylene before decomposition.

* * * * *